United States Patent [19]

Bullinger

[11] 4,134,316

[45] Jan. 16, 1979

[54] APPARATUS FOR CUTTING TIRE CARCASSES INTO INDIVIDUAL ANNULAR ELEMENTS

[76] Inventor: Walter Bullinger, Niederhoferstr. 32-36, 725 Leonberg-Eltingen, Fed. Rep. of Germany

[21] Appl. No.: 768,818

[22] Filed: Feb. 15, 1977

[51] Int. Cl.[2] .......... B23B 5/14

[52] U.S. Cl. .......... 82/56; 82/101; 157/13; 157/13

[58] Field of Search .......... 82/46, 47, 51-54, 82/101, 56

[56] References Cited

U.S. PATENT DOCUMENTS

| | | | |
|---|---|---|---|
| 1,668,214 | 5/1928 | Liebau | 157/13 |
| 1,813,264 | 7/1931 | Wikle | 157/13 |
| 3,701,296 | 10/1972 | Snow | 157/13 X |
| 3,830,120 | 8/1974 | Peterson | 82/54 |
| 4,072,072 | 2/1978 | Harb | 82/56 |

FOREIGN PATENT DOCUMENTS

| | | | |
|---|---|---|---|
| 2344479 | 9/1973 | Fed. Rep. of Germany | 157/13 |

*Primary Examiner*—Leonidas Vlachos
*Attorney, Agent, or Firm*—Edwin E. Greigg

[57] ABSTRACT

An apparatus for severing tire carcasses of any diameter through the tread portion to reduce the carcass to a plurality of annular disposable rings. The apparatus further provides a support for the tire carcass as well as a driving means therefor with the tire support urging the tread portion up into a knife that is disposed tangentially of the tread portion and counter to the rotation of the tire carcass.

6 Claims, 5 Drawing Figures

APPARATUS FOR CUTTING TIRE CARCASSES INTO INDIVIDUAL ANNULAR ELEMENTS

BACKGROUND OF THE INVENTION

The invention relates to an apparatus for cutting tire carcasses provided with or without steel belts into a plurality of annular sections. More particularly, the apparatus includes plural rotatable means which are associated in such a way that they are moved from an inoperative position into an operative position, said latter position of the rotatable means providing both a support for the tire carcass relative to a cutting blade as well as a frictional contact with a drivable roughened rotatable annular body.

With the use of the apparatus described above it will be understood that the only limitation in how many annular sections the tire carcass may be divided into will depend on the number of knives utilized to cut through the tire carcass.

In known apparatus of the initially mentioned type a circular knife that rotates by means of the driving mechanism serves as a cutting element which is disposed approximately in the middle of the driving mechanism. Opposite this cutting-driving mechanism and on the inside of the tire, is disposed a counter gear that is provided with an annular groove and into which the edge of the circular knife can slide after cutting the tire. In this type of construction, the tire is driven essentially by the rotation of the blade itself. Apart from the fact that whenever the circular blade encounters a cavity or tear in the tire, which often exist in the case of such old tires, the drive mechanism often does not operate properly and as a result it is practically impossible to cut through the periphery of the tire satisfactorily. On the one hand where a knife cuts very well, the driving friction for the rotation of the tire is too small and on the other hand, where a knife cuts poorly, i.e., where there is proper rotation of the tire, the complete separation of the carcass into individual parts takes too long. These disadvantages are further increased where tire carcasses have metal belts imbedded in the tread.

OBJECT AND SUMMARY OF THE INVENTION

Accordingly, the present invention is based on the task of developing an apparatus of the aforementioned type with which a tire can be cut up into separate portions much more expeditiously and at a minimum of construction expenditure.

In a further improvement according to the present invention this task is solved by providing at least one fixed knife which serves as the cutting element and the inner wall of the tire carcass is provided with annular elements for supporting the tire and between which the knife enters after completely severing the tire carcass. Machines are known for the longitudinal cutting of tire carcasses where a fixed knife is used, however, the drive and the attachment of the tire in such a construction for the cutting or the driving is entirely too expensive to be practicable. In such a device clamping tongs are used to hold the tire in an open position. Apart from the great expense of such a clamping arrangement, the disadvantage also exists that the clamped part frequently slips since the tongs engage on a relatively smooth circular surface which is running in the direction of rotation, and if one increases the clamping forces the tire could be deformed because of the limited number of clamping rolls and as a consequence the fixed knife would no longer cut uniformly.

In another known construction for the cutting up of tires, a driven circular saw blade serves as the cutting element and in this arrangement, the tire is clamped down by a pair of rims which must be put into rotation. However, such an arrangement is extraordinarily expensive, especially so because pairs of special rims must be used for each tire size. Also another factor today that must be allowed for is the time of a mechanic to mount the tire carcasses on the rims, which would not be possible without a considerable expenditure of time.

As compared to these known arrangements, the invention is distinguished by a particularly simple development with a considerable assurance of proper functioning and an extremely economic method of operation. Above all, both power and time is saved.

Other objects and advantages of the present invention will be more readily apparent from a further consideration of the following detailed description of the drawing illustrating a preferred embodiment of the invention, in which:

DESCRIPTION OF THE PREFERRED EMBODIMENT

Figure 1:
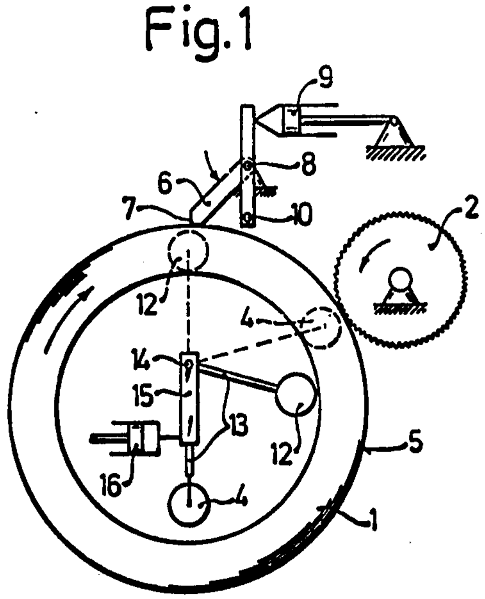
FIG. 1 is a horizontal elevational schematic view showing the carcass mounted preparatory for cutting.
Figure 2:
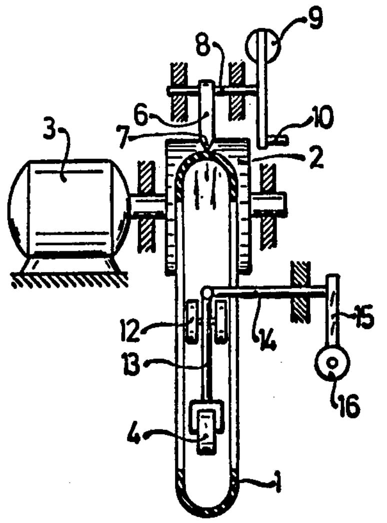
FIG. 2 shows a front elevational view of the tire cutting machine with the tire shown in cross section.

As is shown in FIGS. 1 and 2, a rubber tire carcass 1 is driven by a friction type means 2 developed as an annular body having a roughened surface that is driven by means of a changeable speed electric motor 3. The tire is pressed with its tread 5 against the driven roughened surface 2 by way of a counter gear 4 which has been shown in an operating position in broken lines.

Viewed in the rotational direction of the tire 1, as indicated by an arrow, a knife 6 has been disposed ahead of the driven roughened surface 2, the edge 7 of which knife is disposed obliquely in relation to the tangent of the tire and which is swivelable around a pivot point 8. As shown in FIG. 1, the knife is pushed into the carcass of the tire either as a result of a pneumatically or hydraulically controlled arrangement 9, or by means of an arbitrarily operable lever 10 in the form of a crank or even a spindle gear drive means.

A pair of spacedly arranged annular driving elements 12 serve as abutment means for the knife 6 and between which the knife can enter after cutting through the carcass of the tire, said driving elements also at the same time serving for lateral guidance of the tire 1. The driving elements 12 and the counter gear 4 are disposed in a pair of levers 13, each of which are swivelable about an axis 14 on which an adjustable motor 16 of a pneumatic or hydraulic type, for example, in the form of an operating cylinder, engages by means of a lever 15. As a result of the power transmitting arrangement 16 the counter gear 4 and the driving elements 12 are then rotated into the inside of the tire from the full line position into that position shown in broken lines.

Figure 3:
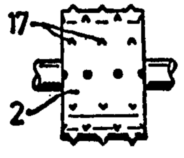
FIG. 3 is an enlarged horizontal view of the driving mechanism.

As shown in FIG. 3, the driven roughened surface 2 may be equipped advantageously with a wheel provided with driving pegs 17 in order to be able to have a good chance of driving the carcass of a smooth tire. These pegs 17 may be arranged in the form of wedges in order to achieve therewith a centering of the tire in case of driving. Advantageously such pegs 17 are also provided in the case of tires for use in ice and snow in which spikes are already present so that merely a metallic contact between the driven roughened surface and the tire would exist possibly as a result of the spikes. The spikes or pegs 17, however, are developed longer than such worn down spikes in the tires so that a gripping by this driving means will be assured.

Figure 4:
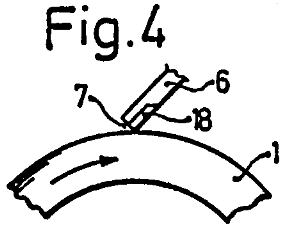
FIG. 4 is a schematic view of the knife and a portion of a tire.

In FIG. 4 a side view of the knife 6 as well as a part of the tire 1 has been shown and in this view the knife 6 is equipped with a cutting part 18 provided on the edge 7 that is made of hard metal. This hard metal part 18 need be provided merely on the side of the edge 7 which comes first in contact with the tire, in order to retain its capability for cutting as long as possible in the case of tires provided with steel belts.

Figure 5:
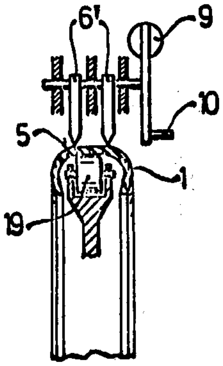
FIG. 5 is a detail of another embodiment showing use of two knives.

FIG. 5 shows a detail of another embodiment of this invention in which two knives 6' are used instead of one knife, it thus being possible to obtain as flat as possible half portions of the tire carcass 1, as well as to make it possible to separate out the tread 5 portion of the tire which would be useable for other purposes. In this embodiment of the invention a single drivable wheel 19 is used instead of the driving elements 12 as a counter wheel, with this could be used additional wheels for circularizing the tire. The knives 6' in the second embodiment is mounted obliquely relative to the tangent of the tread, as a result of which the blade in the case of the predetermined direction of running of the tire, is pressed into the material of the tire, so that in the event of greater resistances and on the basis of the elasticity of the entire clamping arrangement, the angle between the tangent of the blade and its cutting edge is decreased so that a greater cutting effect occurs.

I claim:

1. Apparatus for cutting tire carcasses into a plurality of annular sections comprising, in combination, a rotatable annular body supported adjacent the outer periphery of the tire carcass, means for rotating said annular body, a cutting knife supported adjacent the outer periphery of the tire carcass in circumferentially spaced relationship with said annular body, means for yieldingly urging said cutting knife into cutting engagement with the tire carcass, freely rotatable first and second roller means, means for supporting said first and second roller means in radially disposed, angularly displaced, relationship within the interior of the tire carcass, means for yieldingly moving said supporting means together with said first and second roller means between an inoperative position with said first and second roller means in spaced-apart relationship with the inner periphery of the tire carcass and an operative position with said first and second roller means in rolling engagement with the inner periphery of the tire carcass opposite said cutting knife and said annular body respectively, whereby the tire carasss is rotated during the rotation of said annular body and through the clamping engagement of the tire carcass between said annular body and second roller means and whereby said first roller means provides an abutment means for said cutting knife in cutting engagement with the tire carcass.

2. Apparatus in accordance with claim 1 where said first roller means comprises a plurality of annular elements for accommodating the cutting edge of said cutting knife passing through the wall of the tire carcass during the cutting operation.

3. Apparatus in accordance with claim 1 where the outer surface of said annular body is provided with a plurality of upstanding pegs for frictionally gripping the outer periphery of the tire.

4. Apparatus in accordance with claim 1 wherein said cutting knife is disposed obliquely in relation to a tangent passing through a point on the outer periphery of the tire penetrated by said cutting knife.

5. Apparatus in accordance with claim 1 wherein a plurality of said cutting knives are provided arranged in laterally spaced relationship and wherein said first roller means is arranged to abuttingly engage the inner periphery of the tire between said plurality of cutting knives.

6. Apparatus in accordance with claim 1 wherein said cutting knife includes a cutting edge and wherein said cutting edge is disposed in cutting engagement with the tire carcass counter to the direction of rotation of the carcass.

* * * * *